Jan. 31, 1933. J. C. CROWLEY 1,895,449
VALVE MECHANISM
Filed April 25, 1928
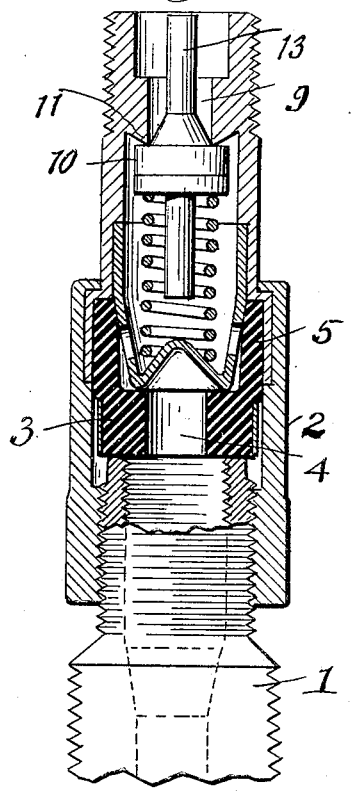
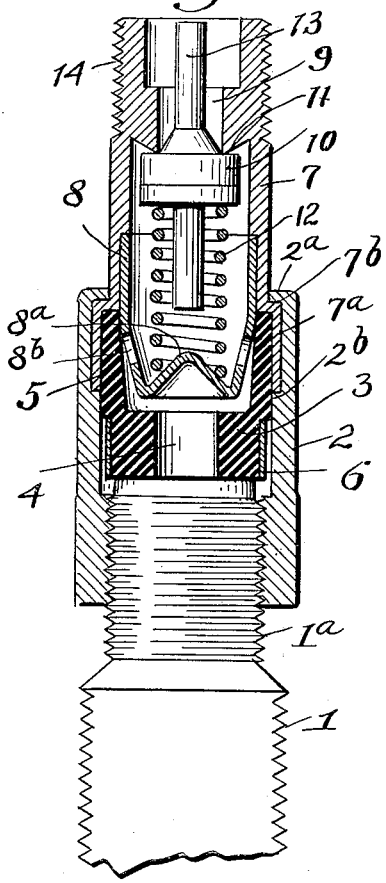
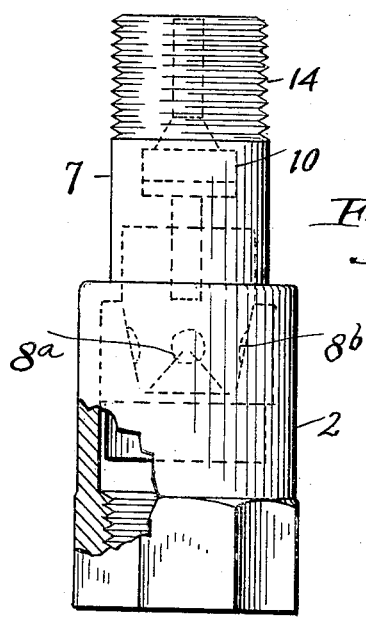
Inventor
John C. Crowley
Rivers Hudson & Kent
Attys Patented Jan. 31, 1933

1,895,449

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE MECHANISM

Application filed April 25, 1928. Serial No. 272,593.

The present invention relates to a valve mechanism which is adapted to be mounted at the end of a tubular air conducting member, such as a valve stem or the like, which in turn is connected with an inflatable article, such as a tire or similar device.

More specifically stated the valve mechanism is intended to be mounted upon the end of a valve stem such as is used in connection with pneumatic tires, either a standard valve stem such as is commonly employed with pneumatic tires at the present time, or a special valve stem where the same may be desired.

The present valve mechanism when used in connection with a valve stem for pneumatic tires, replaces and does away with the use of the usual valve insides. The usual valve insides is mounted within the bore of the usual valve stem and because of the limited space adapted for the reception of such valve insides the mechanism thereof is more or less fragile and liable to injury, as well as the more important fact that the insertion of any valve insides within the bore of a valve stem materially reduces the air passageways and increases the time required for inflation of the tire.

The valve mechanism of this invention being mounted upon the end of the valve stem will be made more robust in its construction, and furthermore, the air passageways through the same may be greatly increased over that which is possible when a valve insides is used in a valve stem, which results in quicker inflation.

Moreover, the present valve mechanism contemplates a positively moved plunger valve, which in cooperation with a suitable gasket and packing will effectively seal, not only the end of the valve stem, but also effectively seal against the leakage of air through the valve mechanism proper.

Reference should be had to the accompanying drawing forming a part of the invention, in which Figure 1 is an elevation with portions in section, showing the valve mechanism in closed position.

Figure 2 is an elevation with portions in section showing the valve mechanism in open position.

Figure 3 is an elevation with a small portion thereof in section.

Referring to the drawing, 1 indicates a valve stem which, in the present instance, is a standard valve stem and is provided with a threaded extension 1a. Mounted upon the extension 1a is a casing 2, which, at its lower end, is provided with interior threads that are adapted to engage with the threads upon the portion 1a of the valve stem.

This mounting upon the valve stem enables the casing 2 to be moved longitudinally with respect to the valve stem by turning the casing 2 in the proper direction to move onto the valve stem or in a direction away from the valve stem.

Within the casing is a cup-shaped washer or gasket 3. This cup-shaped washer has a central opening 4 and an upstanding wall or flange 5. The lower part of the gasket has surrounding the outer wall thereof an annular band 6, which serves to limit the side expansion of the gasket at this point.

Cooperating with the casing 2 is an annular member 7, which has a portion 7a extending within the casing 2, this portion being provided with a shoulder 7b which is adapted to be engaged by a turned over flange 2a of the casing 2. The inner end of the portion 7a engages with a shoulder 2b formed in the casing 2, so that the member 7 is swivelly secured to the sleeve or casing 2.

The member 7 is hollow and has secured thereto a hollow plunger 8, this member 8 being separately formed and attached to the member 7 in any suitable manner. The member 8 at the inner portion thereof is formed with a reentrant conical projection 8a, and there are air openings 8b formed in the wall of the member 8 adjacent the inward projection 8a. The member 7 adjacent the outer end thereof is provided with an air opening 9. Within the hollow member 7 is a valve 10 which normally engages with the seat 11, this valve being normally held to its closed position by means of the spring 12 which, at one end thereof, engages with the valve stem, and at the opposite end engages with the reentrant projection 8a.

The stem 13 for the valve 11 extends through the air opening 9 and is in position to be engaged so as to depress the valve 10. The depression of the stem 13 may be manual or by a suitable member provided in the usual air inflating chuck.

The outer end of the member 7 is threaded, as indicated at 14, for the purpose of receiving a pump connection. As will be seen from the drawing, the annular upstanding flange 5 of the gasket surrounds the plunger 8 and engages with the shoulder 7b of the member 7.

The valve mechanism is operated as follows: Assuming that the valve is in open position, as shown in Figure 2, the casing 2 is rotated in a direction to thread the casing 2 onto the extension 1a. The movement of the casing 2 brings the plunger 8 into contact with the gasket 3, thus sealing the end of the plunger 8 so as to cut off the passage of air, and at the same time the pressure of the plunger 8 compresses the gasket 3 against the end of the valve stem 1, so as to prevent any leakage of air at the end of the valve stem. Simultaneously, the upstanding wall 5 of the gasket is compressed against the inner end of the plunger 8, so that the gasket 5 is compressed and held in its compressed position when the valve mechanism is in its closed position. This is clearly indicated in Figure 1.

By rotating the member 2 in a direction to turn it outwardly on the valve stem 1, the plunger 8 is positively moved outwardly and the resilient action of the gasket, particularly the upstanding flange 5 thereof, will maintain the gasket 3 in engagement with the end of the valve stem while the plunger 8 moves away from the gasket 3, thus establishing a condition where air may pass around the plunger.

With the plunger 8 in open position, as shown in Figure 2, air may be forced into the hollow plunger by introducing air under pressure into the outer end of the member 7, the pressure of the air and the usual mechanical means associated with a pump coupling or air chuck serving to depress the stem 13, thereby permitting the passage of air through the plunger 8, also through the valve stem 1 and to the tire. As soon as the air pressure is released the valve 10 seats itself, thus preventing the outward escape of air, and subsequently the member 2 is turned in a manner, as before described, so as to bring the plunger 8 into engagement with the gasket 3.

It will be seen that there is provided a double seal, first by the engagement between the plunger 8 and the gasket 3, and second, by the valve 10. Furthermore the upstanding flange 5 of the gasket completely seals against the passage of air so that air can pass through the mechanism only by means of the regular passageways provided therefor.

It will be obvious that various changes may be made from the precise arrangement which has been described, without departing from the spirit of the invention.

Having thus described my invention what I claim as new, is:

1. A valve mechanism comprising a casing adapted to be movably mounted upon the end of a valve stem, a gasket arranged in said casing adapted to bear upon the end of the valve stem and having a central opening therein and provided with a flange disposed longitudinally of said casing, and a plunger within said casing and movable thereby toward and away from said gasket, said plunger having an opening therein and an end portion arranged to engage the gasket when the plunger is moved inwardly to seal the opening in said gasket and another portion which engages the flange of said gasket and compresses the same.

2. A valve mechanism comprising a casing adapted to be movably mounted upon the end of a valve stem, a gasket arranged in said casing adapted to bear upon the end of the valve stem and having a central opening therein and provided with a flange disposed longitudinally of said casing, and a plunger within said casing and swivelly connected with the same to be moved toward and away from said gasket, said plunger having an opening therein and an end portion arranged to engage the gasket when the plunger is moved toward the same to seal the opening in said gasket and another portion which engages the flange of said gasket and compresses the same.

3. A valve mechanism comprising a casing adapted to be movably mounted upon the end of a valve stem, a gasket arranged in said casing adapted to bear upon the end of the valve stem and having a central opening therein and being provided with means restricting said gasket against lateral expansion, said gasket also having a flange disposed longitudinally of said casing, a plunger within said casing and movable thereby toward and from said gasket, said plunger having an opening therein and an imperforate end portion arranged to engage the gasket when the plunger is moved toward the same to seal the opening therein and another portion which engages the flange of said gasket and compresses the same.

4. A valve mechanism comprising a casing adapted to be movably mounted upon the end of a valve stem, a gasket arranged in said casing adapted to bear upon the end of the valve stem and having a central opening therein and provided with a flange disposed longitudinally of said casing, a plunger within said casing and movable thereby toward and away from said gasket, said plunger having an opening therein and an imperforate end portion arranged to engage the gasket when the plunger is moved toward the same to seal the opening in the gasket and another portion which normally engages the flange of said gasket and compresses the same, the resilience of the compressed flange of the gasket acting to maintain the gasket in engagement with the end of the stem when the plunger is moved away from the end of said stem.

5. A valve mechanism comprising a casing adapted to be movably mounted upon the end of a valve stem, a cup-shaped gasket arranged in said casing with its bottom having a central opening therein and adapted to bear upon the end of the valve stem, a plunger within said casing and movable thereby toward and away from the bottom of said cup-shaped gasket, said plunger having an opening therein and an imperforate end portion arranged to engage the bottom of the gasket when the plunger is moved toward the same to seal the opening therein and another portion which normally engages the wall of said cup-shaped gasket and compresses the same.

6. A valve mechanism comprising a casing adapted to be movably mounted upon the end of a valve stem, a gasket arranged in said casing adapted to bear upon the end of the valve stem and having a central opening therein and provided with a flange disposed longitudinally of said casing, a plunger within said casing and movable thereby toward and away from said gasket, said plunger having an imperforate end portion and being provided with an air passage therethrough which has a valve seat therein, a valve member arranged in said plunger and adapted to seat on said valve seat, a resilient member normally urging said valve to seated position, the imperforate end portion of said plunger being arranged to engage the gasket when the plunger is moved toward the same to seal the opening in said gasket, said plunger also having a portion which normally engages the flange of said gasket and compresses the same.

7. In a valve mechanism comprising a casing adapted to be movably mounted upon the end of a valve stem, a plunger comprising a tubular member having a portion arranged in said casing and operatively connected thereto and a hollow member having an imperforate end portion and being connected to said tubular member to extend into said casing, and a gasket arranged in said casing adapted to bear upon the end of the valve stem and having a central opening therein and being provided with a portion extending into said plunger between the tubular member and the hollow member, the imperforate end portion of the hollow member being arranged to engage the gasket when the plunger is moved toward the same to seal the opening in said plunger, the portion of the gasket between said tubular member and said hollow member being normally compressed by the plunger.

8. A valve mechanism comprising a casing adapted to be movably mounted upon the end of a valve stem and having an inwardly turned flange at its free end, a plunger cooperating with said casing and comprising a tubular member having an enlarged end fitting within the casing and forming a shoulder with which said flange cooperates to swivelly connect said casing and tubular member, a hollow member carried by said tubular member and extending into the enlarged end portion thereof, said hollow member being inwardly tapered within the enlarged end portion of the tubular member and having an imperforate end, and a gasket arranged in said casing adapted to bear upon the end of the valve stem and having a central opening therein, said gasket being provided with a flange extending between the tubular member and the hollow member of the plunger, the imperforate end of said hollow member being arranged to engage said gasket when the plunger is moved toward the same to seal the opening therein and said plunger normally compressing said flange.

In testimony whereof, I hereunto affix my signature.

JOHN C. CROWLEY.